(12) United States Patent
Panin

(10) Patent No.: US 9,038,415 B2
(45) Date of Patent: May 26, 2015

(54) COMPOSITE ISOPIPE

(75) Inventor: Nikolay Anatolyevich Panin, Saint-Petersburg (RU)

(73) Assignee: Corning Incorporated, Corning, NY (US)

( * ) Notice: Subject to any disclaimer, the term of this patent is extended or adjusted under 35 U.S.C. 154(b) by 289 days.

(21) Appl. No.: 13/699,942

(22) PCT Filed: May 26, 2011

(86) PCT No.: PCT/US2011/038109
§ 371 (c)(1),
(2), (4) Date: Jan. 8, 2013

(87) PCT Pub. No.: WO2011/150189
PCT Pub. Date: Dec. 1, 2011

(65) Prior Publication Data
US 2013/0192307 A1      Aug. 1, 2013

Related U.S. Application Data

(60) Provisional application No. 61/349,362, filed on May 28, 2010.

(51) Int. Cl.
*C03B 17/06* (2006.01)

(52) U.S. Cl.
CPC ................... *C03B 17/064* (2013.01)

(58) Field of Classification Search
CPC ........ C03B 4/06; C03B 17/064; C03B 17/067
USPC ................................... 65/53, 195
See application file for complete search history.

(56) References Cited

U.S. PATENT DOCUMENTS

| | | | |
|---|---|---|---|
| 2005/0138966 A1* | 6/2005 | Pitbladdo | 65/29.21 |
| 2009/0100873 A1* | 4/2009 | Allan et al. | 65/85 |
| 2011/0126587 A1* | 6/2011 | Berkey et al. | 65/29.21 |
| 2012/0180528 A1 | 7/2012 | Ketcham et al. | 65/53 |
| 2012/0227445 A1* | 9/2012 | Citti et al. | 65/53 |

FOREIGN PATENT DOCUMENTS

JP     H05-139766 A      6/1993

OTHER PUBLICATIONS

PGM Database, "Platinum", Accessed Jul. 28, 2014, http://www.pgmdatabase.com/jmpgm/data/datasheet.do?record=1219&database=cesdatabase.*
PGM Database, "Pt-ZGS Minimum Creep Rate", Accessed Jul. 28, 2014, Published 1974, http://www.pgmdatabase.com/jmpgm/data/datasheet.do?record=167.*
"The PGM Database", retrieved from the internet: url: http://www.pgmdatabase.com/jmpgm/index.jsp?record=1070.
R.G. Munro, "Evaluated Material Properties for a Sintered α-Alumina", J. AM. Ceram. Soc., 1997, vol. 80, No. 8, pp. 1919-1928.
Application No. 11787401.6, filed Nov. 29, 2012, Oct. 14, 2013 Extended Supplementary Search Report.

* cited by examiner

*Primary Examiner* — Cynthia Szewczyk
(74) *Attorney, Agent, or Firm* — Ryan T. Hardee

(57) ABSTRACT

A fusion down-draw method for making a glass sheet using a forming body comprising an upper part (101) made of a first material and a lower part (103) made of a second material, where the first material has lower creep rate than the second material at the normal operating temperature of the forming body, and an fusion down-draw forming apparatus comprising such forming body. The invention is advantageous in that it solves the issues of internal stress and long-term creep issue of a unitary forming body made of a single material such as zircon.

23 Claims, 4 Drawing Sheets

COMPOSITE ISOPIPE

This application claims the benefit of priority under 35 U.S.C. §365 of International Patent Application Serial No. PCT/US2011/038109 filed on May 26, 2011 designating the United States of America, which in turn claims the benefit of priority under 35 U.S.C. §119 of U.S. Provisional Application Ser. No. 61/349,362 filed May 28, 2010, the content of which is relied upon and incorporated herein by reference in its entirety.

TECHNICAL FIELD

The present invention relates to methods and apparatuses for making sheet glass. In particular, the present invention relates to fusion down-draw processes for making sheet glass and apparatuses used in such processes. The present invention is useful, e.g., in making high-precision glass substrates suitable for use in liquid crystal displays (LCDs).

BACKGROUND

In each currently prevailing LCD device such as a TV set, two pieces of high-precision glass sheets are used, one as a substrate for the electronic circuit components such as thin film transistors (TFT), and the other as a substrate for a color filter. Various technologies are available for making such high-precision optical glass substrates. A leading one is the overflow fusion down-draw technology developed by Corning Incorporated, Corning, N.Y., U.S.A., which involves the use of a forming body typically called an isopipe, a forming pipe, a forming trough, or a forming device. The forming body typically comprises an upper part comprising two upper trough walls and a trough bottom defining a trough space for accepting molten glass, and a lower part having a wedge-shaped cross-section having two major side surfaces sloping downwardly to join at a root, where the side walls of the upper part and the lower part form two continuous forming surfaces. During operation, molten glass is filled into the trough, allowed to overflow the top surfaces (called weirs) of the trough, down along the two major side surfaces, and then join at the converging line of the two surfaces (called root) to form a unitary glass ribbon with both external surfaces that have not been exposed to the surface of the forming body. The ribbon is drawn down and cooled to form an elastic glass sheet having desired thickness and pristine external surfaces.

The manufacture of high quality LCDs having high image quality with ever growing sizes imposes ever more stringent requirements on the geometric and dimensional stability of the forming body. In order to make continuous glass sheet with sufficient width, the forming body is typically suspended on the ends only. During operation, the forming body is subjected to the gravity of its own and the molten glass it supports, and very high operating temperature such as 1200-1300° C. At such high temperature and large external load, it is very challenging to address the stability issue over a long manufacture campaign. Corning Incorporated has successfully developed various technologies over the past few decades to solve this problem, including the application of upward bending moment to the forming body by imposing compressive forces at both the inlet and the compressive ends, and the use of high-performance materials that are less subjected to sagging.

However, as the desirable size of the glass sheet grew larger and larger over time, so was the horizontal span of the forming body. A forming body with a larger span (length) made of the same material tends to distort more in a given period of time and at a given working condition. In addition, a unitary forming body made of a single material meeting all geometric and shape stability requirements is very expensive, even at relatively small size.

Therefore, there is a genuine need of a forming body design for the overflow fusion down-draw process which is economical to fabricate, maintain, operate and suitable for making glass sheets having a large width.

The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, according to a first aspect of the present invention, provided is an apparatus for making a glass sheet used in a fusion down-draw process, comprising a forming body having an upper part (101) made of a first material and a lower part (103) made of a second material below said upper part (101), wherein the upper part (101) comprises two upper trough walls (112, 114) and a trough bottom defining a trough space (105) for accepting molten glass, and the lower part (103) has a wedge-shaped cross-section having two major surfaces sloping downwardly to join at a root, and the side walls of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1<CR2.

In certain embodiments of the first aspect of the present invention, $CR2/CR1 > 10^3$, in certain embodiments $CR2/CR1 > 10^4$, in certain other embodiments $CR2/CR1 > 10^5$.

In certain embodiments of the first aspect of the present invention, $CR1 < 1 \times 10^{-7}$, in certain embodiments $CR1 < 1 \times 10^{-8}$, in certain other embodiments $CR1 < 1 \times 10^{-9}$, in certain other embodiments $CR1 < 1 \times 10^{-10}$, in certain other embodiments $CR1 < 1 \times 10^{-11}$, in certain other embodiments $CR1 < 1 \times 10^{-12}$.

In certain embodiments of the first aspect of the present invention, the apparatus further comprises a furnace enclosing the forming body adapted for maintaining the upper part (101) of the forming body at a substantially constant temperature, and maintaining the lower part (103) of the forming body to have a temperature gradient of deltaT=Ttop−Troot, where Ttop is the temperature of the top of the lower part (103), Troot is the temperature of the root (108) of the lower part (103), and deltaT≥10° C., in certain embodiments deltaT≥20° C., in certain embodiments deltaT≥30° C., in certain embodiments deltaT≥50° C., in certain embodiments deltaT≥80° C., in certain embodiments deltaT≤100° C., in certain embodiments deltaT≤80° C., in certain other embodiments deltaT≤60° C.

In certain embodiments of the first aspect of the present invention, the second material has a creep rating CR2 at 1200° C. and a load of 200 psi where $CR2 \leq 1 \times 10^{-5}$ hour$^{-1}$.

In certain embodiments of the first aspect of the present invention, the first material has a creep rate CR1 at 1200° C. and a load of 200 psi where $CR1 \geq 1 \times 10^{-13}$ hour$^{-1}$.

In certain embodiments of the first aspect of the present invention, the lower part (103) has a wing (104, 106) at each end supported by a pier block (105, 107). In certain embodiments, each of the pier blocks (105, 107) exerts a compressive force F, F' to the end of the lower part (103), such that a compressive moment exists inside the lower part (103) to reduce sagging of the lower part (103) of the forming body.

In certain embodiments of the first aspect of the present invention, the first material consists essentially of α-SiC, silicon nitride or silicon oxynitride, and the second material consists essentially of zircon.

In certain embodiments of the first aspect of the present invention, the upper part (101) further comprises a cavity. In certain embodiments, the apparatus further comprises a heating element inside the cavity (115) adapted for heating the forming body.

In certain embodiments of the first aspect of the present invention, the bottom surface of the upper part (101) and the top surface of the lower part (103) have reciprocal, interlocking features formed thereon.

A second aspect of the present invention is related to a method for making a glass sheet comprising the following steps:

(A) providing a glass melt;

(B) providing a forming body having an upper part (101) made of a first material and a lower part (103) made of a second material below said upper part (101), wherein the upper part (101) comprises two upper trough sidewalls and a trough bottom surface defining a trough space (105) for accepting molten glass, and the lower part (103) has a wedge-shaped cross-section having two major surfaces sloping downwardly to join at a root, and the external side surfaces of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1<CR2;

(C) supplying the glass melt into the trough of the forming body, and allowing the glass melt to overflow the top surfaces of the trough sidewalls, flow over the two forming surfaces, and join at the root (108) to form a unitary glass ribbon;

(D) drawing the glass ribbon below the root (108) to form the glass sheet.

In certain embodiments of the second aspect of the present invention, $CR2/CR1>10^3$, in certain embodiments $CR2/CR1>10^4$, in certain other embodiments $CR2/CR1>10^5$.

In certain embodiments of the second aspect of the present invention, the method further comprises the following steps (E) and (F):

(E) maintaining the upper part (101) of the forming body at a substantially constant temperature by a muffle; and (F) maintaining the lower part (103) of the forming body to have a temperature gradient of deltaT=Ttop−Troot, where Ttop is the temperature of the top of the lower part (103), Troot is the temperature of the root (108) of the lower part (103), and deltaT≥10° C., in certain embodiments deltaT≥20° C., in certain embodiments deltaT≥30° C., in certain embodiments deltaT≥50° C., in certain embodiments deltaT≥80° C., in certain embodiments deltaT≤100° C., in certain embodiments deltaT≤80° C., in certain other embodiments deltaT≤60° C.

In certain embodiments of the second aspect of the present invention, the second material is chosen to have a creep rate CR2 at 1200° C. and a load of 200 psi where $CR2 \leq 1 \times 10^{-5}$ $hour^{-1}$.

In certain embodiments of the second aspect of the present invention, the first material is chosen to have a creep rate CR1 at 1200° C. and a load of 200 psi where $CR1 \geq 1 \times 10^{-13}$ $hour^{-1}$.

In certain embodiments of the second aspect of the present invention, the lower part (103) has a wing (104, 106) at each end supported by a pier block (105, 107).

In certain embodiments, a compressive force F, F' is exerted to each end of the lower part (103) through the pier blocks (105, 107) such that a compressive moment exists inside the lower part (103) to reduce sagging of the lower part (103) of the forming body.

In certain embodiments of the second aspect of the present invention, the first material consists essentially of α-SiC, silicon nitride, or silicon oxynitride, and the second material consists essentially of zircon.

In certain embodiments of the second aspect of the present invention, the upper part (101) further comprises a cavity. In certain embodiments, a heating element is provided inside the cavity (115) to heat the upper part (101) of the forming body.

In certain embodiments of the second aspect of the present invention, the bottom surface of the upper part (101) and the top surface of the lower part (103) have reciprocal, interlocking features formed thereon.

In certain embodiments of the second aspect of the present invention, step (B) comprises:

(B1) obtaining an upper part (101) made of the first material of a used forming body;

(B2) obtaining a new lower part (103) made of the second material; and (B3) stacking the upper part (101) over the lower part (103) to provide the forming body.

One or more embodiments and/or aspects of the present disclosure have one or more of the following advantages. First, the upper part (101) of the forming body can be recycled and reused in multiple production runs, leaving only the lower part (103) to be replaced, and even the lower part (103) can be refurbished for a smaller generation forming body, therefore reducing the average cost of the forming body in a production run. Second, the service life of a forming body can be extended compared to a conventional, unitary forming body made of a single ceramic material such as zircon, due to the less sagging of the lower part (103) and the lack of sagging of the upper part (101). Third, the upper part (101) can be made to have an internal cavity, which can reduce the material consumption in the making of the forming body, reduce weight load on the lower part (103), thereby reducing the costs and extending the service life of the forming body at the same time.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Figure 1:
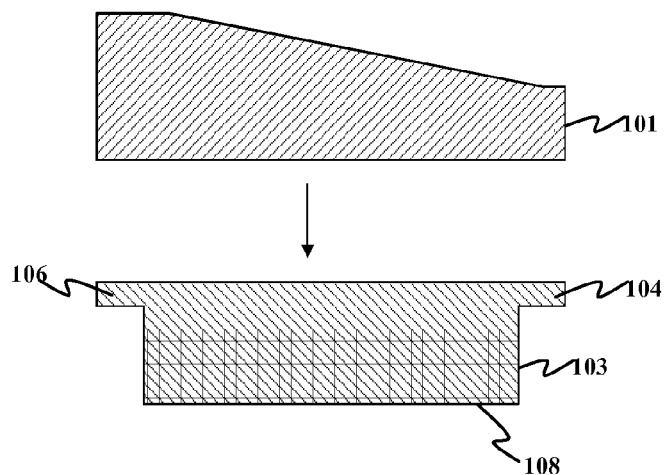
FIG. 1 is a schematic illustration of the side views of the upper and lower parts (101, 103) of a forming body before being stacked together according to one embodiment of the present invention.
Figure 3:
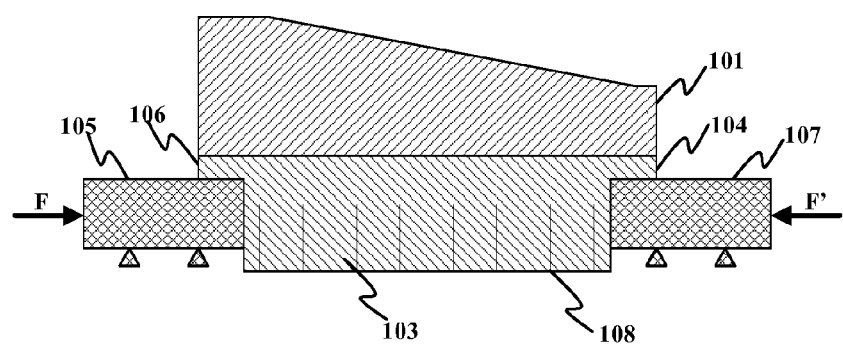
FIG. 3 is a schematic illustration of the side view of a forming body in operation according to one embodiment of the present invention.
Figure 2:
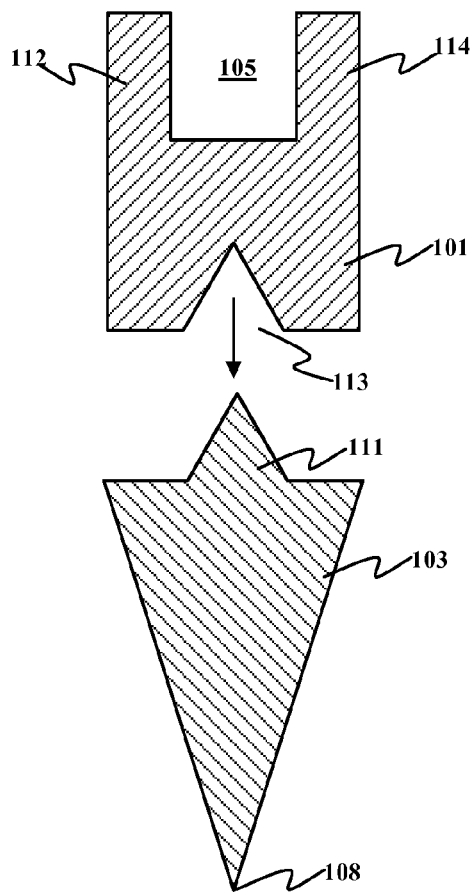
FIG. 2 is a schematic illustration of an end view of the upper and lower parts (101, 103) of a forming body before being stacked together according to one embodiment of the present invention.
Figure 4:
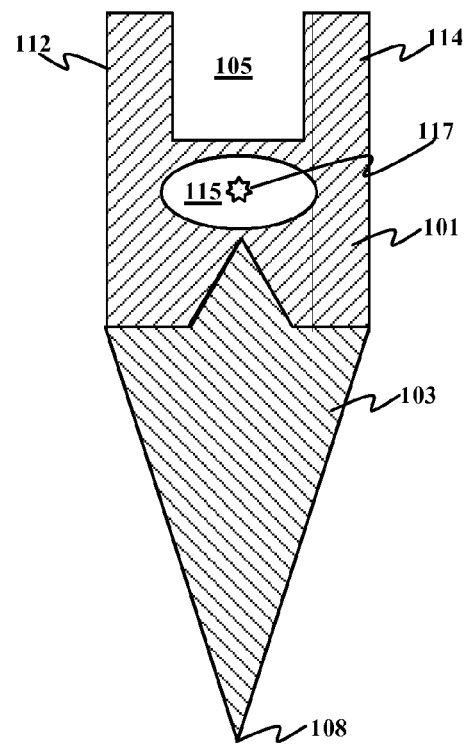
FIG. 4 is a schematic illustration of an end view of the upper and lower parts (101, 103) of a forming body in operation according to another embodiment of the present invention.
Figure 5:
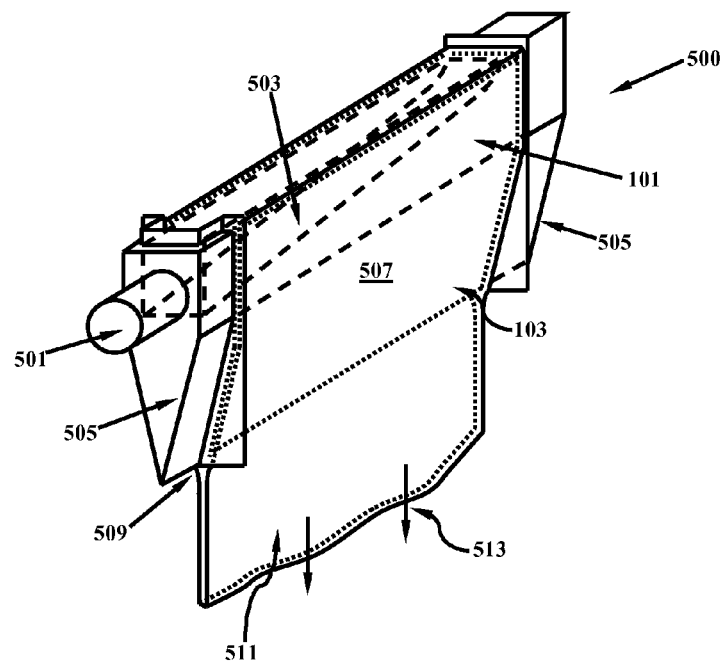
FIG. 5 is a schematic illustration of a forming body operating in fusion down-draw process to make a glass sheet.

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a cavity" includes embodiments having one, two or more such cavity(ies) 115, unless the context clearly indicates otherwise.

A bulk material in the present disclosure is a continuous solid mass having a total volume of at least 200 cubic centimeters ($cm^3$) at room temperature. Thus a stack of powders or pellets each having a total volume less than 100 $cm^3$ is not considered as being a bulk material in the present disclosure.

Creep rate of the material is measured by standard techniques available in the prior art at 1200° C. and a load of 200 psi ($1.38 \times 10^6$ pascal).

The forming body of a fusion down-draw process operates at very high temperatures, e.g., above 1100° C. for certain glass compositions, and is subjected to a high load due to its own weight and the weight of the molten glass it supports. Moreover, due to the nature of the process, the glass melt is cooled down from the top to the root, imposing a temperature gradient to the forming body. It is known that zircon-based forming bodies creep at operational stresses and temperatures, leading to irreversible sagging which progresses over time. Deformation of the forming body leads to flow pattern change and thickness variation of the produced sheet. After a certain service period, the deformation becomes so excessive that the forming body had to be replaced or rebuilt. The forming body in and of itself is very costly to manufacture and install. The termination of the production campaign and rebuild of the production line as a result can cause even greater production loss.

One approach developed by Corning to reduce sagging of the forming body is to impose a compressive force to both ends of the forming body through a pair of piers which also support the ends of the forming body. While this method is effective to prolong the service life of a zirbon-based forming body by a few years for a small generation size production line, such effect is limited, especially for large-size forming bodies such as those having a length of more than 2000 mm.

While materials having a significantly lower creep rate than zircon exist, a unitary forming body made entirely of a single material that does not creep under operating conditions would experience unduly high internal stress due to the necessary temperature gradient for a successful down-draw process. Creeping of the forming body can relax the internal stress caused by the temperature gradient. The lack of creeping and persistent high stress can cause catastrophic failure of the forming body.

The present invention offers a solution to the conflicting issues of creeping and stress in the forming body by providing a composite forming body made of at least two materials having different creep rates under the normal operating conditions.

The present invention will then be described and illustrated with reference to various embodiments shown in the appended drawing FIGS. 1-6. It should be noted that one having ordinary skill in the art, with benefit of the disclosure herein, may envisage other embodiments which also fall within the scope of the present invention as claimed.

The upper part 101 of the forming body according to the first aspect of the present invention is made of a first material and comprises two upper trough walls (112, 114) and a trough bottom that together define a trough space (105) for accepting molten glass. The lower part 103 of the forming body is made of a second material and comprises a wedge having two major side surfaces sloping downwardly to join at a common line 108 which is typically straight and called root of the forming body. The upper part 101 is stacked over the lower part 103. Desirably, the assembly of the forming body comprising the upper and the lower parts 101, 103 has an appearance and function substantially similar to a conventional forming body made from a unitary piece of zircon. Thus, the external side surfaces of the upper part 101 and the lower part 103 desirably form two major, continuous and smooth side surfaces on which glass melt can flow without abrupt change of velocity direction. Desirably, the width of the upper part 101 is substantially the same as the lower part 103 at the interface between them at the normal operating temperature. During operation, the forming body is connected to upstream devices and ancillary equipment such as the forming trough inlet pipe, endcaps and edge directors and the like, such as those disclosed in the prior art, so that a glass sheet can be made therefrom using the fusion down-draw method. Both the upper part 101 and the lower part 103 are subjected to high temperatures at which molten glass can flow at a result of gravity.

The first material forming the upper part 101 of the forming body has a significantly lower creep rate than the second material forming the lower part 103 at the operating temperature of the forming body. Thus, it is desired that CR2/CR1>$10^3$, in certain embodiments CR2/CR1>$10^4$, in certain embodiments CR2/CR1>$10^5$, where CR2 and CR1 are the creep rates of the second and first materials at 1200° C., respectively. For example, the first material can be a ceramic of α-SiC, silicon nitride, or silicon oxynitride, and the second material can be a ceramic of zircon, zirconia, alumina, MgO, or a refractory metal such as Pt and Pt-containing alloys, and the like. Desirably, even for the second material, $CR2<1\times 10^{-5}$ hour$^{-1}$, more desirably $CR2\leq 1\times 10^{-6}$ hour$^{-1}$, still more desirably $CR2<1\times 10^{-7}$ hour$^{-1}$. In general, for a forming body made of a unitary piece of ceramic material such as zircon having a length of at least 2000 mm, it is highly desirable that the creep rate of the material is at most $1\times 10^{-6}$ hour$^{-1}$. However, for the present invention, due to the composite structure, the requirement for CR2 can be more relaxed and can be from, e.g., about $1\times 10^{-5}$ hour$^{-1}$ to about $1\times 10^{-6}$ hour$^{-1}$, to achieve substantially the same amount of threshold amount of creep.

Figure 6:
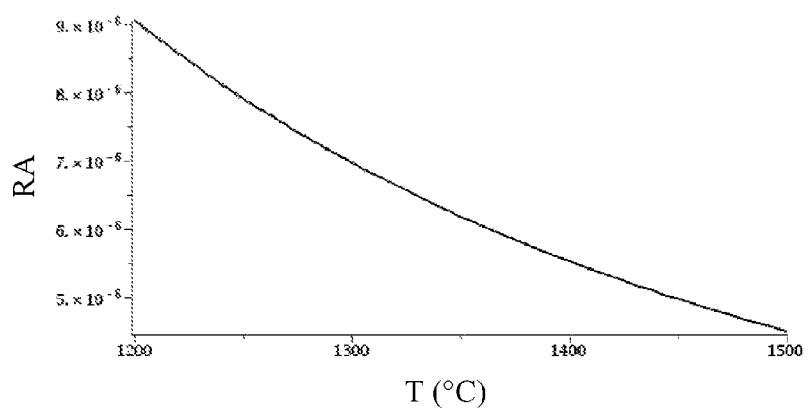
FIG. 6 is a diagram showing the ratio CRA/CRB as a function of temperature of a forming body comprising α-SiC upper part and a zircon lower part (103), where CRA is the creep rate of the upper part and CRB is the creep rate of the lower part (103).

FIG. 6 is a diagram showing the ratio RA=CRA/CRB as a function of temperature, where CRA is the creep rate of α-SiC at different temperatures, and CRB is the creep rate of zircon at different temperatures. This diagram shows that the creep rate of α-SiC is about $1\times 10^{-6}$ of that of zircon at around 1200° C.

During operation, the forming body of the present invention is typically housed inside a muffle to maintain the desired temperature and temperature gradients, such as a muffle used to enclose a traditional, unitary, single-material forming body disclosed in the prior art. Desirably, the muffle comprises several segments each having adjustable heating power, such that the upper part 101 of the forming body can be maintained at a substantially constant operating temperature, and the lower part 103 of the forming body is maintained to have a temperature gradient from the top to the bottom (root). For example, it is desirable that the upper part 101 can be maintained within a temperature range of Tav±10° C., more desirably Tav±4° C., still more desirably Tav±2° C., still more desirably Tav±1° C., from the weir to the interface between the upper and lower parts 101, 103, where Tav is the average temperature of the upper part 101. Desirably, the lower part 103 of the forming body can be maintained to have a temperature gradient deltaT=Ttop−Troot, where Ttop is the temperature of the top of the lower part 103 (i.e., temperature at the interface between the upper and lower parts 101, 103), Troot is the temperature of the root 108 of the forming body (i.e., the lowest part of the lower part 103), and deltaT≥10° C., in certain embodiments deltaT≥20° C., in certain embodiments deltaT≥30° C., in certain embodiments deltaT≥50° C., in certain embodiments deltaT≥80° C., in certain embodiments deltaT≤100° C., in certain embodiments deltaT≤80° C., in certain other embodiments deltaT≤60° C. In certain embodiments, the temperature gradient in the lower part 103 of the forming body is substantially linear from the top to the bottom.

Due to the very low creep rate of the upper part 101, the upper part 101 remains substantially elastic and does not creep during normal operation. In addition, due to the substantially constant temperature throughout the bulk of the upper part 101, the upper part 101 is not subjected to significant thermal stress caused by a steep temperature gradient. While the lower part 103 is exposed to the temperature gradient required for successful forming of a glass ribbon to be drawn at the root, the relatively high creep rate of the second material allows for the relaxation of the thermal stress caused by deltaT.

Much similar to the set-up of a regular forming body in a conventional fusion down-draw process, the forming body of the present invention is advantageously supported by a pier block 105, 107 at each end of the lower part 103, and the upper part 101 is then, in turn, supported by the lower part 103. To that end, it is desired that the lower part 103 has two protruding wing-shape ends 104 and 106 which can be placed over the supporting pier blocks 105 and 107. To reduce sagging of the lower part 103 of the forming body during its service period, it is desired that the a compressive force F, F' is exerted to each end of the lower part 103 through the pier blocks 105 and 107, so that an upward bending moment is created inside the body of the lower part 103, which counteracts the sagging tendency due to the heavy weight of the upper and lower parts 101, 103 and the molten glass.

Due to the exceedingly low creep rate of the first material even at high operating temperatures, one or more cavity(ies) 115 can be formed inside the upper part 101 without substantially affect the creeping of the upper part 101 during operation. Desirably, one can form one or more straight channel cavity(ies) 115 through the bulk of the upper part 101 from one end to the other. Cavity(ies) 115 penetrating only part of the length of the upper part 101 can also be formed. One advantage of the presence of the cavity(ies) 115 is that it can reduce the material needed for the upper part 101, lower the manufacture cost, and reduce the weight significantly, thereby reducing the stress generated by temperature gradient inside the upper part 101 and the weight thereof, and reducing the sagging of the lower part 103 due to the weight load. Desirably, the cavity(ies) 115 constitute at least 10% of the total volume space occupied by the upper part 101, in certain embodiments at least 20%, in certain embodiments at least 30%, in certain other embodiments at least 40%, in yet certain other embodiments at least 50%. In addition, a heating element, such as a SiC glow bar 117, can be inserted into one or more of the cavity(ies) 115, which can heat the upper and lower parts 101, 103 of the forming body during initial startup and normal operation, and maintain the forming body at the desired temperature and temperature gradient.

The lower surface of the upper part 101 is desirably stacked directly over an upper surface of the lower part 103. Desirably, the contact between the upper part 101 and the lower part 103 is essentially gapless. Thus, in one embodiment, the upper part 101 has an essentially flat lower surface, and the lower part 103 has an essentially flat upper surface, and the two surfaces are allowed to directly contact each other. In another embodiment, the lower surface of the upper part 101 and the upper surface of the lower part 103 have reciprocal surface curvatures such that the two surfaces can engage each other intimately. For example, the lower surface of the upper part 101 may have a convex contour, and the upper surface of the lower part 103 may have a corresponding concave contour which accepts the convex contour of the upper part 101. For another example, the lower surface of the upper part 101 may have a concave channel 113, and the upper surface of the lower part 103 may have a convex protrusion 111 for inserting into the concave channel 113. Once the upper part 101 is stacked on the lower part 103, the surface features allow for the interlocking between the two parts.

It is highly desired that the first material and the second material have substantially the same linear coefficients of expansion in the temperature range from room temperature to the normal operating temperature of the forming body. However, this is sometimes difficult, if not impossible, to achieve, due to the significantly different creep rates of the two materials. Nonetheless, it is desired that the lower surface of the upper part 101 and the upper surface of the lower part 103 are substantially flush during normal operation, i.e., have substantially the same width, so that the side surfaces of the upper and lower part 101, 103 combine to form two continuous, substantially smooth forming surfaces without a gap, a dip or a bump. To that end, if the two materials have different expansion behaviors and different amounts of linear expansion from room temperature to the operating temperature, one skilled in the art can design the lower surface of the upper part 101 and the upper surface of the lower part 103 to have slightly different width dimensions at room temperature so that after being heated to the operating temperature, they expand to substantially the same width and become substantially flush.

The fabrication of the forming body according to the present invention involves the formation of the upper part 101 and the lower part 103 separately. Where the lower part 103 is made of a zircon-based material, it may be fabricated by methods disclosed in, e.g., WO02/44102, WO08/066725, WO09/054951, WO09/058345, and the like, the disclosure of all of which are incorporated herein by reference in their entirety. Large, dense ceramic bulk of the first material may be made by sintering a green body made from particles thereof, from which a trough and the optional internal cavity (ies) 115 may be machined. Likewise, large ceramic bulk of the second material may be made by sintering from a green body made of particles thereof, from which the lower part 103 comprising the wedge may be machined. The interlocking surface features, if desired, can be formed by machining as well. The upper and lower parts 101, 103 are then stacked together to form the forming body assembly, which is placed into a muffle and connected to other upstream and downstream equipment.

During a glass manufacture process, the forming body 500 is first preheated to a temperature close to the operating temperature. A molten glass is then introduced into the trough 505 of the upper part 101 via an inlet pipe 501. Once the trough 505 is filled completely, the molten glass will be allowed to overflow both weirs of the upper part 101, flow downwardly along the two side surfaces 507 of the upper part 101 and the lower part 103, cooled down gradually on the side surface of the lower part 103, then reaches the root 509 of the lower part 103, where a unitary fused glass ribbon 511 having a higher viscosity than at the inlet pipe 501 is formed and drawn downwardly 513 by pulling rolls (not shown) directly in contact with the edges of the glass ribbon. The forming body assembly can further comprises endcaps 505, edge directors (not shown) and other ancillary components.

Given the exceedingly low creep rate of the first material, the upper part 101 stays substantially elastic during the whole manufacture campaign. Yet the lower part 103 will be allowed to creep and sag, albeit at a much lower rate than a conventional zircon-based unitary forming body. At the end of the manufacture campaign, the production is halted, and the forming body can be taken out of the muffle and disassembled, and the spent, distorted lower part 103 can be replaced with a new one, stacked with the existing upper part 101, and then installed in a new muffle again. Thus, a great advantage of the present invention is the recyclability and reusability of the upper part 101 of the forming body, which can potentially reduce the cost of the forming body of a fusion down-draw process significantly. Even for the lower part 103, because of a simplified geometry, it may be machined to a smaller size and used in a production line featuring a forming body with a smaller length. The conventional forming body made of a single ceramic material such as zircon can be more difficult to recycle and reuse because: (i) at the end of the campaign, both weirs and the root 108 have distorted and therefore machining of both would be required; and (ii) the complex shape of the unitary body including the trough, the side surfaces and the wedge would be much more difficult to refurbish than a lower part 103 only.

The following examples further illustrate the present invention. It should be understood, however, that the examples are merely for illustration purpose and shall not be interpreted to limit the invention as claimed in any way.

EXAMPLES

Figure 7:
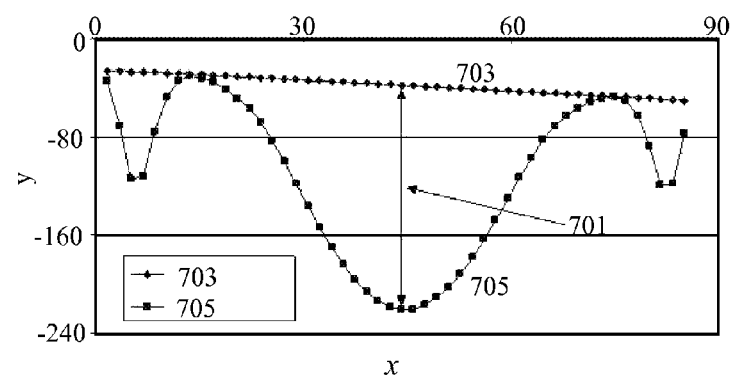
FIG. 7 is a diagram showing the distortion of the lower surface of the upper part and the upper surface of the lower part (103) of a forming body according to one embodiment of the present invention.

A composite isopipe comprising an upper part 101 made of α-SiC and a lower part 103 made of zircon having a length of 79 inches (2000 mm) operating with a root temperature of 1164° C. and a weir temperature of 1221° C. and a compressive force F of 6000 lbs (26,689 newton) at each end was analyzed by mathematical simulation. FIG. 7 shows estimative shape change at the interface between the upper and lower parts. The data on the horizontal axis are distance from the compressive end of the forming body (i.e., the end of the forming body directed subjected to a compressive force F opposite to the end the glass melt inlet is located), and the data on the vertical axis are deflection rate at micrometers per year. Curve 703 shows the shape of the lower surface of the upper part 101, and curve 705 shows the shape of the upper surface of the lower part 103. The distance 701 shows the maximal gap between the lower surface of the upper part 101 and the upper surface of the lower part 103. As expected, the top part essentially does not change shape because its creep over time is negligible, and it only inclines and shifts because it is leaning on the deforming lower part 103. The lower part 103 creeps over time due to the relatively high creep rate of zircon. The complicated shape at the interface is caused by the applied bending moment. The difference between curves 703 and 705 is gap growth rate between the upper and lower parts at various locations from the compression end.

Figure 8:
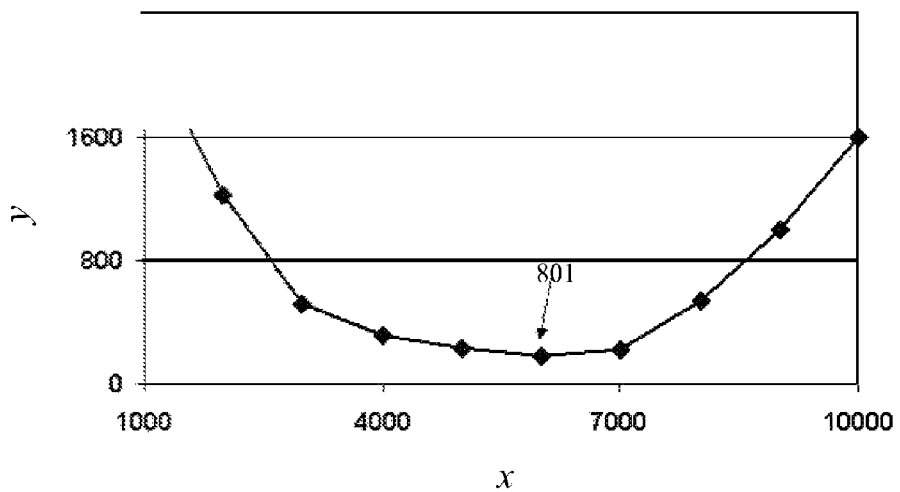
FIG. 8 is a diagram showing the maximal distortion of the root as a function of compressive forces F, F' applied to the ends thereof.

The same forming body at the same working temperatures but at different compressive load was then analyzed by mathematical simulation for the influence of compressive force F on the growth rate of the maximal gap 701. Shown on the horizontal axis of FIG. 8 is compressive force F in pound force, and on the vertical axis is maximal gap growth rate at micrometers per year. As can be seen, minimal growth rate was observed at a compressive force F of about 6000 pound forces.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. An apparatus for making a glass sheet using a fusion down-draw process, comprising a forming body having an upper part (101) made of a first material and a lower part (103) made of a second material below said upper part (101), wherein the upper part (101) comprises two upper trough walls (112, 114) and a trough bottom defining a trough space (105) for accepting molten glass, and the lower part (103) has a wedge-shaped cross-section having two major surfaces sloping downwardly to join at a root, and the side walls of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1<CR2, wherein the first material consists essentially of α-SiC, silicon nitride or silicon oxynitride, and the second material consists essentially of zircon.

2. An apparatus for making a glass sheet according to claim 1, wherein CR2/CR1>10³.

3. An apparatus for making a glass sheet according to claim 1, further comprising a furnace enclosing the forming body adapted for maintaining the upper part (101) of the forming body at a substantially constant temperature, and maintaining the lower part (103) of the forming body to have a temperature gradient of deltaT=Ttop−Troot, where Ttop is the temperature of the top of the lower part (103), Troot is the temperature of the root (108) of the lower part (103), and deltaT≥10° C.

4. An apparatus for making a glass sheet according to claim 1, wherein CR2≤1×10$^{-5}$ hour$^{-1}$ at 1200° C. and a load of 200 psi.

5. An apparatus for making a glass sheet according to claim 1, wherein CR1≥1×10$^{-13}$ hour$^{-1}$ at 1200° C. and a load of 200 psi.

6. An apparatus for making a glass sheet according to claim 1, wherein the lower part (103) has a wing (104, 106) at each end supported by a pier block (105, 107).

7. An apparatus for making a glass sheet according to claim 1, wherein each of the pier blocks (105, 107) exerts a compressive force F, F' to the end of the lower part (103), such that a compressive moment exists inside the lower part (103) to reduce sagging of the lower part (103) of the forming body.

8. An apparatus for making a glass sheet according to claim 1, wherein the upper part (101) further comprises a cavity.

9. An apparatus for making a glass sheet according to claim 8, further comprising a heating element inside the cavity (115) adapted for heating the forming body.

10. An apparatus for making a glass sheet according to claim 1, wherein the bottom surface of the upper part (101) and the top surface of the lower part (103) have reciprocal, interlocking features formed thereon.

11. A method for making a glass sheet comprising the following steps:
   (A) providing a glass melt;
   (B) providing a forming body having an upper part (101) made of a first material and a lower part (103) made of a second material below said upper part (101), wherein the upper part (101) comprises two upper trough sidewalls and a trough bottom surface defining a trough space (105) for accepting molten glass, and the lower part (103) has a wedge-shaped cross-section having two major surfaces sloping downwardly to join at a root, and the external side surfaces of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1<CR2;
   (C) supplying the glass melt into the trough of the forming body, and allowing the glass melt to overflow the top surfaces of the trough sidewalls, flow over the two forming surfaces, and join at the root (108) to form a unitary glass ribbon;
   (D) drawing the glass ribbon below the root (108) to form the glass sheet,
   wherein the first material consists essentially of α-SiC, silicon nitride, or silicon oxynitride, and the second material consists essentially of zircon.

12. A method for making a glass sheet according to claim 11, wherein CR2/CR1>10$^3$.

13. A method according to claim 11, further comprising the following steps (E) and (F):
   (E) maintaining the upper part (101) of the forming body at a substantially constant temperature by a muffle; and
   (F) maintaining the lower part (103) of the forming body to have a temperature gradient of deltaT=Ttop−Troot, where Ttop is the temperature of the top of the lower part (103), Troot is the temperature of the root (108) of the lower part (103), and deltaT≥10° C.

14. A method according to claim 11, wherein CR2≤1×10$^{-5}$ hour$^{-1}$ at 1200° C. and a load of 200 psi.

15. A method according to claim 11, wherein CR1≥1×10$^{-13}$ hour$^{-1}$ at 1200° C. and a load of 200 psi.

16. A method according to claim 11, wherein the lower part (103) has a wing (104, 106) at each end supported by a pier block (105, 107).

17. A method for making a glass sheet according to claim 11, further comprising a compressive force F, F' to each end of the lower part (103) through the pier blocks (105, 107) such that a compressive moment exists inside the lower part (103) to reduce sagging of the lower part (103) of the forming body.

18. A method for making a glass sheet according to the preceding claim 11, wherein the upper part (101) further comprises a cavity.

19. A method for making a glass sheet according to claim 11, further comprising heating the upper part (101) of by a heating element inside the cavity.

20. A method for making a glass sheet according to claim 11, wherein the bottom surface of the upper part (101) and the top surface of the lower part (103) have reciprocal, interlocking features fonned thereon.

21. A method for making a glass sheet according to claim 11, wherein step (B) comprises:
   (B1) obtaining an upper part (101) made of the first material of a used forming body;
   (B2) obtaining a new lower part (103) made of the second material; and
   (B3) stacking the upper part (101) over the lower part (103) to provide the forming body.

22. An apparatus for making a glass sheet using a fusion clown-draw process, comprising a forming body having an upper part (101) made of a first material and a lower part (103) made of a second material below said upper part (101), wherein the upper part (101) comprises two upper trough walls (112, 114) and a trough bottom defining a trough space (105) for accepting molten glass, and the lower part (103) has a wedge-shaped cross-section having two major surfaces sloping downwardly to join at a root, and the side walls of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1 CR2,
   wherein the bottom surface of the upper part (101) and the top surface of the lower part (103) have reciprocal, interlocking features formed thereon.

23. A method for making a glass sheet comprising the following steps:
   (A) providing a glass melt;
   (B) providing a forming body having an upper part (101) made of a first material and a lower part (103) made of a second material below said upper part (101), wherein the upper part (101) comprises two upper trough sidewalls and a trough bottom surface defining a trough space (105) for accepting molten glass, and the lower part (103) has a wedge-shaped cross-section having two major surfaces sloping downwardly to join at a root, and the external side surfaces of the upper part (101) and the lower part (103) form substantially two continuous forming surfaces on which streams of molten glass can flow downwardly to join at the root (108) during normal operation, the first material has a creep rate at 1200° C. of CR1, and the second material has a creep rate at 1200° C. of CR2, and CR1<CR2;

(C) supplying the glass melt into the trough of the forming body, and allowing the glass melt to overflow the top surfaces of the trough sidewalls, flow over the two forming surfaces, and join at the root (108) to form a unitary glass ribbon; and (D) drawing the glass ribbon below the root (108) to form the glass sheet, wherein the bottom surface of the upper part (101) and the top surface of the lower part (103) have reciprocal, interlocking features formed thereon.

* * * * *